US012800025B2

(12) United States Patent
Turek et al.

(10) Patent No.: US 12,800,025 B2
(45) Date of Patent: Nov. 17, 2026

(54) EPICYCLIC GEAR ASSEMBLY PLANETARY GEAR CARRIER

(71) Applicant: HAMILTON SUNDSTRAND CORPORATION, Charlotte, NC (US)

(72) Inventors: Łukasz Turek, Wrocław (PL); Jonathan Darby, Newcastle (GB); Paweł Aleksander Chmielewski, Jelenia Góra (PL); Stephen Harlow Davies, Shrewsbury (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 19/091,781

(22) Filed: Mar. 26, 2025

(65) Prior Publication Data

US 2025/0341250 A1 Nov. 6, 2025

(30) Foreign Application Priority Data

May 5, 2024 (EP) .................................... 24461567

(51) Int. Cl.
*F16H 57/08* (2006.01)
*F16H 1/28* (2006.01)

(52) U.S. Cl.
CPC ............ *F16H 57/082* (2013.01); *F16H 1/28* (2013.01); *F16H 1/2836* (2013.01)

(58) Field of Classification Search
CPC ......... F16H 57/082; F16H 1/28; F16H 1/2836
See application file for complete search history.

(56) References Cited

U.S. PATENT DOCUMENTS

| | | | | |
|---|---|---|---|---|
| 5,098,359 A | | 3/1992 | Chales et al. | |
| 8,172,717 B2 | | 5/2012 | Lopez et al. | |
| 2012/0028756 A1 | * | 2/2012 | Lopez | F16H 57/082 475/346 |
| 2012/0316027 A1 | * | 12/2012 | Erno | F16H 57/082 475/331 |

FOREIGN PATENT DOCUMENTS

| | | | | |
|---|---|---|---|---|
| CN | 208919301 U | | 5/2019 | |
| DE | 102016219949 A1 | * | 4/2018 | F16H 57/082 |
| WO | 2023065072 A1 | | 4/2023 | |

OTHER PUBLICATIONS

Extended European Search Report dated Oct. 8, 2024, for corresponding European Patent Application No. 24461567.0, 9 pgs.

* cited by examiner

*Primary Examiner* — Tinh T Dang
(74) *Attorney, Agent, or Firm* — Kinney & Lange, P.A.

(57) ABSTRACT

A planetary gear carrier assembly includes a plurality of planetary gears each rotatable about a respective planet axis defined by a respective pin through the gear, and a planetary gear carrier defining an annular housing having a front face and a back face defining a housing therebetween and an annulus axis. The plurality of planetary gears are located within and spaced circumferentially around the housing, the pin of each planetary gear passing from the front face to the back face at a location such that the planetary gear partially extends radially outwards of the carrier periphery. The carrier is provided with compliance, the compliance provided by one or more portions of reduced stiffness in the front and back faces adjacent the location of the pin of one or more of the planetary gears.

20 Claims, 4 Drawing Sheets

EPICYCLIC GEAR ASSEMBLY PLANETARY GEAR CARRIER

CROSS-REFERENCE TO RELATED APPLICATION(S)

The present application claims priority to European Patent Application No. 24461567.0 filed on May 5, 2024, the contents of which are incorporated by reference herein in its entirety.

TECHNICAL FIELD

The present disclosure relates to epicyclic gear assemblies and, more particularly, to a carrier for planetary gears of an epicyclic gear assembly.

BACKGROUND

Many transmission systems use epicyclic gear assemblies to transmit torque from an input side to an output side. An epicyclic gear assembly typically comprises an input shaft that rotates a central, or sun gear, about an axis. A number of planetary gears are mounted around the sun gear for toothed engagement with the sun gear and earth ring. The gear ratio of the system is determined by the arrangement and sizes of the gears. The planetary gears are typically supported relative to the sun gear in a planetary carrier.

An advantage of such epicyclic or planetary transmissions is that input torque is split into a number of parallel paths. For a planetary system having n planetary gears, each sun-planet path is designed to carry 1/n of the input torque. In an ideal system, each planet is equally loaded. In practice, however, the load will be unequally shared between the planetary gears due to misalignments arising from e.g. manufacturing, material or assembly errors/tolerances. This means that one or more planets may carry a greater load than others which can have serious implications on operation and reliability of the assembly and affect e.g. gear system sizing, tolerance schemes and torque ratings in unpredicted ways. These load differences increase with increasing numbers of planetary gears.

There is, therefore, a need for an assembly that improves load distribution between planetary gears for an epicyclic gear system, preferably for any number of planetary gears.

SUMMARY

According to one aspect, there is provided a planetary gear carrier assembly comprising: a plurality of planetary gears each rotatable about a respective planet axis defined by a respective pin P' through the gear; a planetary gear carrier defining an annular housing having a front face and a back face defining a housing therebetween and an annulus axis A, wherein the plurality of planetary gears are located within and spaced circumferentially around the housing, the pin of each planetary gear passing from the front to the back face at a location such that the planetary gear partially extends radially outwards of the carrier periphery; wherein the carrier is provided with compliance, the compliance provided by one or more portions of reduced stiffness in the carrier front and back faces adjacent the location of the pin of one or more of the planetary gears.

According to another aspect, there is provided an epicyclic gear assembly including such a carrier assembly.

BRIEF DESCRIPTION

Examples of the planetary gear carrier and the epicyclic gear assembly will now be described with reference to the drawings. It should be noted that these are examples only and variations are possible within the scope of the claims.

DETAILED DESCRIPTION

Figure 1:
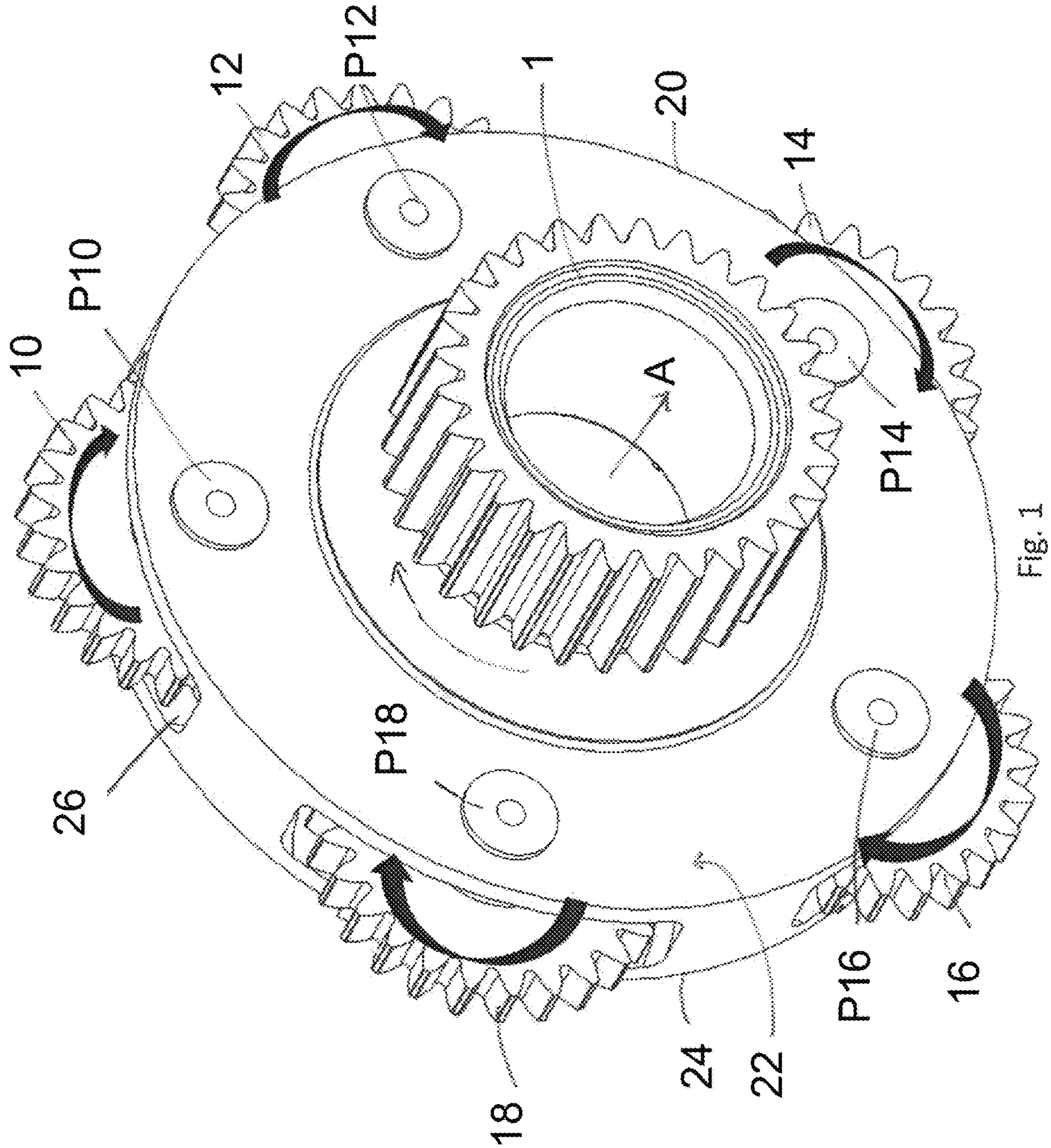
FIG. 1 shows an example of a conventional planetary gear carrier.

FIG. 1 shows, by way of background, a set of planetary gears 10, 12, 14, 16, 18 of an epicyclic transmission assembly. The drawing shows the input shaft, the rotation of which is transmitted to an output via the transmission assembly according to a gear ratio defined by the transmission assembly. The transmission assembly includes a sun gear 1, that is located within the carrier envelope. The sun gear is coaxial with the input shaft and so rotation of the input shaft about its axis A causes corresponding rotation of the sun gear.

The transmission assembly further comprises the plurality of planetary gears 10, 12, 14, 16, 18 that are located around the sun gear and arranged to be in toothed engagement with the sun gear such that as the sun gear rotates about its axis A, it meshes with the planetary gears causing them to rotate (typically in the opposite direction of rotation) each about their own axes P10, P12, P14, P16, P18. The example shown has five planetary gears, but other numbers of planets are also possible as is known in the art.

The planetary gears 10, 12, 14, 16, 18 are mounted to be properly located relative to the sun gear by being accommodated in and supported by a carrier 20. The carrier 20 may be in the form of an annular housing, mounted about, and coaxially with, the sun gear and the input shaft 1. In the example shown, the carrier 20 may have a front face 22 and a rear face 24 and a cavity 26 therebetween to receive the planetary gears. Each planetary gear is secured to the carrier 20 by means of a pin forming the axis of rotation P10, P12, P14, P16, P18 of the planetary gear, the pin extending from the carrier front face to the rear face via the respective planet 10, 12, 14, 16, 18. The carrier, the pins and the planets are arranged such that each planet is able to rotate about its own axis P10, P12, P14, P16, P18 between the carrier faces 22, 24. The location of the pins is such that the planets extend beyond the periphery of the carrier such that they are able to mesh with an output gear to provide the transmitted output.

As mentioned above, in an ideal case, the load or torque from the input shaft, via the sun gear, would be equally distributed across the planetary gears, but in reality, e.g. to misalignments due to manufacturing/material or assembly errors, the load will be unevenly distributed and one or some planets will carry a greater load than others. In addition, variations in temperature may cause uneven expansion of the gear material, also resulting in uneven load distribution.

The assembly according to this disclosure introduces compliance into the carrier assembly to compensate for, and correct for uneven loading across the planetary gears.

Figure 2:
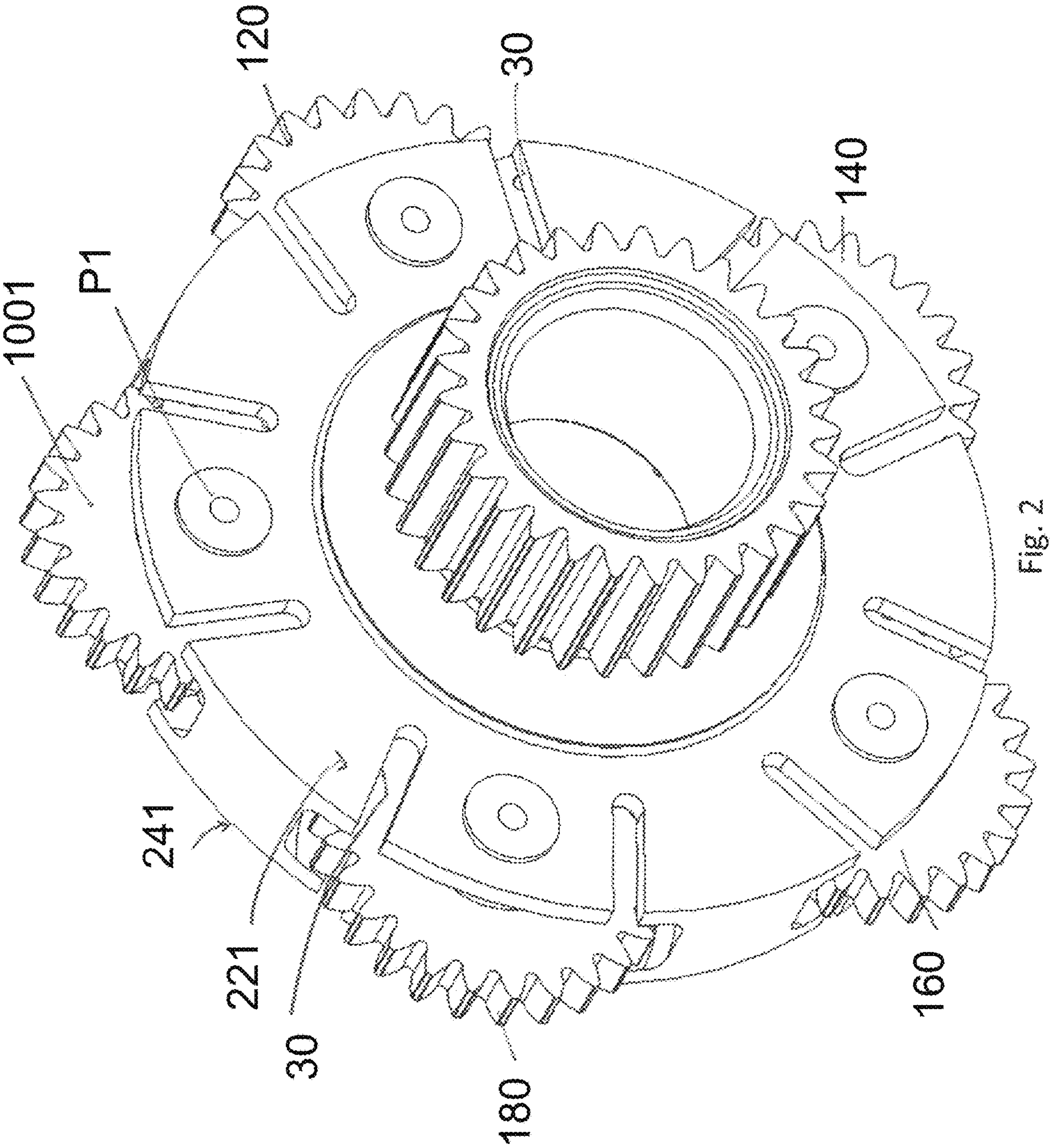
FIG. 2 shows an example of a planetary gear carrier according to the disclosure.
Figure 3:
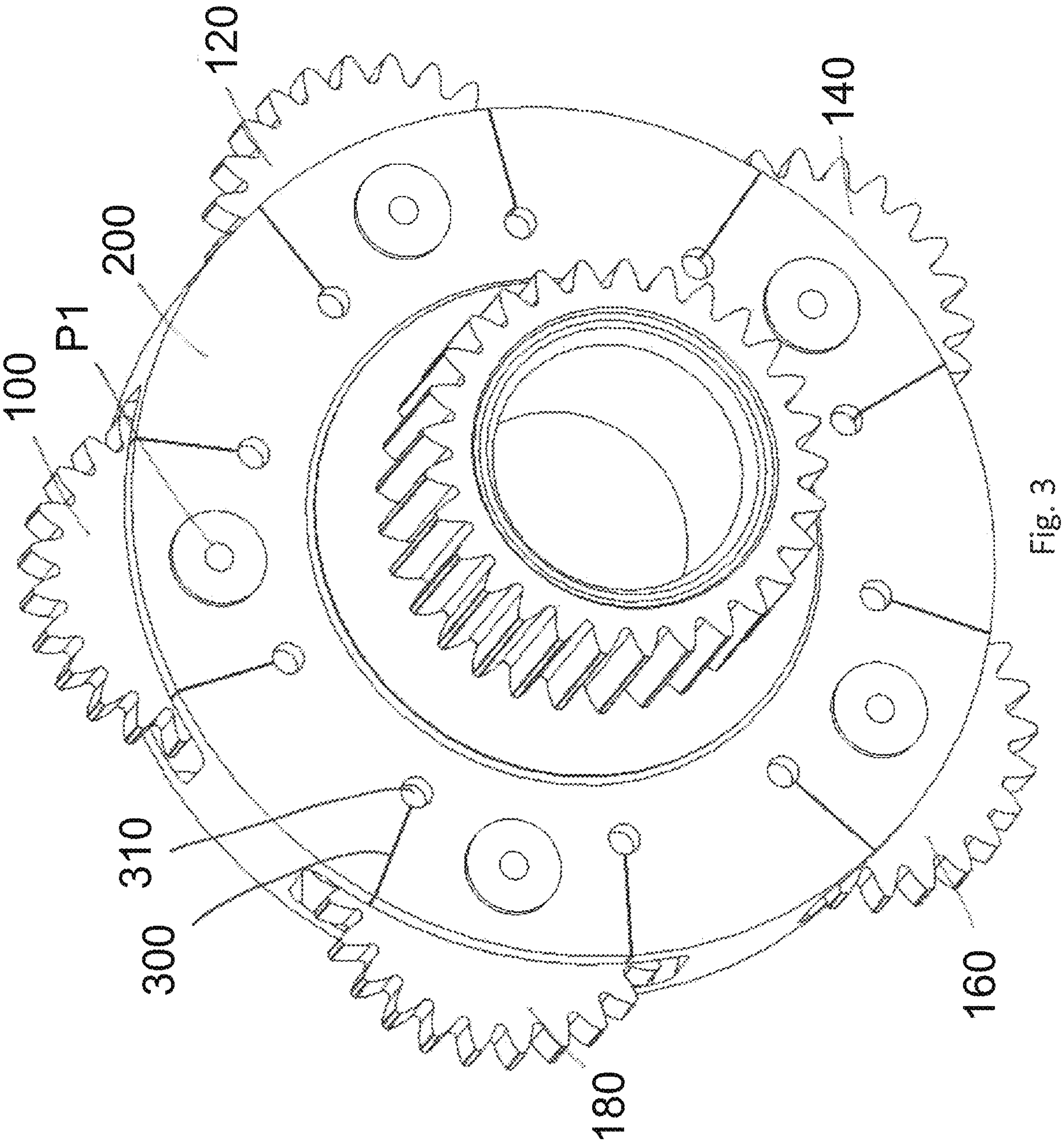
FIG. 3 shows an alternative example of a planetary gear carrier according to the disclosure.

This will be explained with reference to two examples, as shown in FIGS. 2 and 3, but other examples are also possible within the scope of the claims.

According to the solution, compliance is added to the carrier 20', 200, by means of a portion 30, 300 of reduced stiffness formed in the carrier 20', 200 adjacent the axis pin P' of one or more of the planetary gears 100, 120, 140, 160, 180. The variation in local stiffness of the carrier makes the carrier compliant, which allows the position of the pin and, hence, the planetary gear, to be adjusted with respect to the carrier. In other words, portions of reduced stiffness in the carrier faces 22', 24' around the points of attached of the planets to the carrier result in the local stiffness of the carrier being tuned to balance the load on the planetary gears.

In the example shown in FIG. 2, the local stiffness of the carrier is tuned by radially extending slots 30 formed in the carrier 20', either side of the location on the carrier where the planetary gears are mounted to the carrier. In the example shown, for each planetary gear 100, 120, 140, 160, 180 a slot 30 is provided on either side of the gear i.e. in the front and rear faces 22', 24' of the housing and is configured such that the pin P' of the respective planetary gear is positioned substantially in equidistant between the slots. In the example shown, the slots 30 extend radially from the outer circumference of the carrier faces part-way towards the carrier annulus. The radial depth and the width of the slots can be selected according to the desired degree of compliance of the carrier. Wider (in the circumferential direction) slots allow for greater deformation of the carrier responsive to uneven load distribution across the planetary gears, and greater compliance but at the cost of reduced strength of the carrier overall.

In the example shown in FIG. 3, the portion of reduced stiffness is formed by thin slots or cuts 300 extending radially into the carrier faces. Such thin cuts provide a self-limiting effect on deformation of the carrier and have improved strength compared to the wider slots of the example shown in FIG. 2. To simplify manufacture, and allow insertion/removal of the cutting tool, relief holes 310 may be formed at the radially inner ends of the slots/cuts 300.

Figure 5:
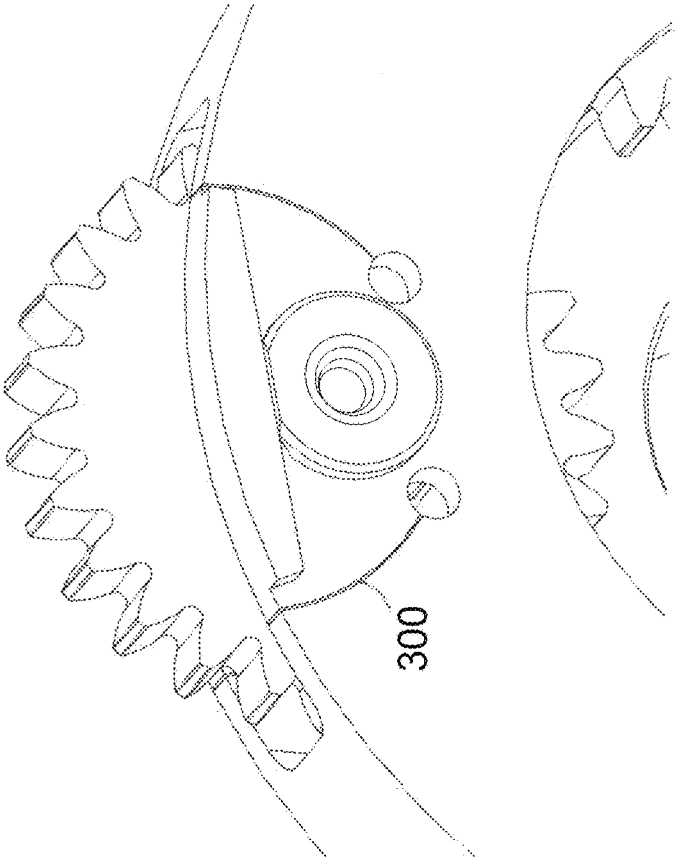
FIG. 5 shows a close-up detail of an alternative example.
Figure 4:
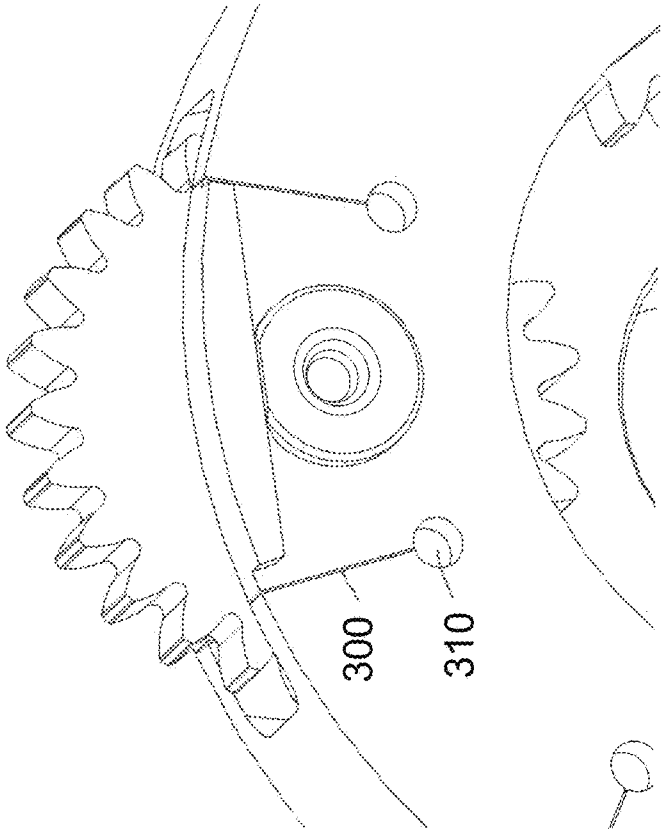
FIG. 4 shows a close-up detail of the example of FIG. 3.

In the example of FIG. 3, shown in close-up in FIG. 4, the slots/cuts 300 extending straight in the radial direction resulting in a tangential stiffness reduction providing a relatively low compliance, that has been found to be particularly (but not exclusively) suitable for high precision gears. In another example, shown in FIG. 5, the cuts 300' may be arcuate, curving inwards towards each other as they extend radially inwards from the carrier circumference. This design provides a greater degree of compliance and has been found to be especially suitable for low precision gears.

As the cuts (or, where present, the relief holes 310 at the end of the cuts) get closer together, the compliance increases, but there is a trade off between strength and compliance and so the design of the reduced stiffness portion will depend on the nature of the application and the requirements of use.

In an ideal state, when the load on that planetary gear is equal to 1/n of the total load for an assembly with n planetary gears, the cuts or slots are unloaded and the location of the pin P' in the slot is the desired position to correctly position the respective planetary gear in a balanced assembly. As the load distribution varies across the planetary gears and one or more become more loaded than 1/n, the cuts/slots/reduced stiffness portions allow for some deformation of the carrier around the pin P' to re-centre or re-balance the planetary gears.

In the example shown, portions of reduced stiffness are provided for each planetary gear, although it is envisaged that fewer than all planetary gears may be provided with such a balancing arrangement.

The compliant load-sharing epicyclic carrier of this disclosure allows equal and balanced load sharing across multiple planetary gears within a fixed carrier planetary system. The system is able to self-adjust for load and temperature variations. As the system does not need to be designed to account for uneven loading, this solution increases the load-carrying capability of the system, while reducing cost, envelope and weight of a multi-planetary system. In addition, the arrangement provides damping against shock loading.

The invention claimed is:

1. A planetary gear carrier assembly comprising:

a plurality of planetary gears each rotatable about a respective planet axis defined by a respective pin through the gear; and a planetary gear carrier defining an annular housing having a front face and a back face defining a housing therebetween and an annulus axis, wherein the plurality of planetary gears are located within and spaced circumferentially around the housing, the pin of each planetary gear passing from the front face to the back face at a location such that the planetary gear partially extends in a radial direction outwards of the carrier periphery, wherein an outer edge of the housing is defined by an outer edge of the front face and the outer edge of the back face, wherein the outer edge of the housing constitutes a circle and a portion of the circle is adjacent to each of the plurality of planetary gears and constitutes an arc;

wherein the carrier is provided with compliance, the compliance provided by a plurality of portions of reduced stiffness in the front and back faces adjacent the location of the pin of one or more of the planetary gears, wherein the plurality of portions of reduced stiffness comprise slots that extend in the radial direction from the outer edge of the front face and the outer edge of the back face part-way toward an annulus of the planetary gear carrier, the slots having a width that is less than the arc.

2. The planetary gear carrier assembly of claim 1, wherein the plurality of portions of reduced stiffness in the front and back faces are adjacent the location of the pin of two or more of the plurality of planetary gears.

3. The planetary gear carrier assembly of claim 2, wherein the plurality of portions of reduced stiffness in the front and back faces are adjacent the location of the pin of each of the plurality of planetary gears.

4. The planetary gear carrier assembly of claim 1, wherein the slots of the plurality of portions of reduced stiffness are formed in the front and back faces of the planetary gear carrier on each side of the pin of one or more of the plurality of planetary gears.

5. The planetary gear carrier assembly of claim 2, wherein the slots of the plurality of portions of reduced stiffness are formed in the front and back faces of the planetary gear carrier on each side of the pin of two or more of the plurality of planetary gears.

6. The planetary gear carrier assembly of claim 3, wherein the slots of the plurality of portions of reduced stiffness are formed in the front and back faces of the planetary gear carrier on each side of the pin of each of the plurality of planetary gears.

7. The planetary gear carrier assembly of claim 1, wherein the plurality of portions of reduced stiffness comprise the radially extending slots formed in the front and back faces with a relief hole formed at a radially inner end of each of the slots.

8. The planetary gear carrier assembly of claim 7, wherein the relief hole formed at the radially inner end of each of the slots has a width greater than the width of the slots.

9. The planetary gear carrier assembly of claim 2, wherein the plurality of portions of reduced stiffness comprise the radially extending slots formed in the front and back faces with a relief hole formed at a radially inner end of each of the slots.

10. The planetary gear carrier assembly of claim 9, wherein the relief hole formed at the radially inner end of each of the slots has a width greater than the width of the slots.

11. The planetary gear carrier assembly of claim 3, wherein the plurality of portions of reduced stiffness comprise the radially extending slots formed in the front and back faces with a relief hole formed at a radially inner end of each of the slots.

12. The planetary gear carrier assembly of claim 11, wherein the relief hole formed at the radially inner end of each of the cuts-slots has a width greater than the width of the slots.

13. The planetary gear carrier assembly of claim 1, wherein the slots of the plurality of portions of reduced stiffness are straight portions extending in the radial direction.

14. The planetary gear carrier assembly of claim 2, wherein the slots of the plurality of portions of reduced stiffness are straight portions extending in the radial direction.

15. The planetary gear carrier assembly of claim 1, wherein the slots of the plurality of portions of reduced stiffness are curved portions extending in the radial direction.

16. The planetary gear carrier assembly of claim 2, wherein the slots of the plurality of portions of reduced stiffness are curved portions extending in the radial direction.

17. The planetary gear carrier assembly of claim 4, wherein the plurality of portions of reduced stiffness on each side of the location of a pin are closer to each other at their radially inner ends than at their radially outer ends.

18. The planetary gear carrier assembly of claim 5, wherein the plurality of portions of reduced stiffness on each side of the location of a pin are closer to each other at their radially inner ends than at their radially outer ends.

19. An epicyclic gear assembly comprising:

a sun gear; and a carrier assembly as claimed in claim 1, the sun gear located coaxially with the planetary gear carrier and radially inwards of the plurality of planetary gears for meshing engagement with the plurality of planetary gears.

20. An epicyclic gear assembly as claimed in claim 19, further comprising an input shaft extending through and coaxial with the annular axis of the planetary gear carrier and in meshing engagement with the sun gear.

* * * * *